Patented Oct. 9, 1951

2,570,392

UNITED STATES PATENT OFFICE 2,570,392

HALOGENATION OF SUBSTITUTED PTERIDINES

Doris Ruth Seeger, Bound Brook, and Donna Bernice Cosulich, North Plainfield, N. J., assignors to American Cyanamid Company, New York, N. Y., a corporation of Maine No Drawing. Application March 23, 1950, Serial No. 151,540

8 Claims. (Cl. 260—251.5)

This invention relates to a method of preparing halogenated compounds. More particularly, it relates to the direct halogenation of substituted pteridines.

Wieland and Purrmann (Ann. 544, 179 (1939)) described the reaction of 2-amino-4,6,7-trihydroxypteridine (leucopterin) in acetic acid and hydrochloric acid with chlorine. The constitution of the product which they obtained has not been definitely established. It is believed, however, that it may have been 2-imino-5-hydroxyuramil-7-oxamide. Similarly, Wieland and Tartter (Ann. 543, 287 (1940)) described the reaction of 2,4,6,7-tetrahydroxypteridine (desiminoleucopterin) with chlorine in methanol. The principal product which they obtained was 5-methoxyuramil-7-oxalic acid methyl ester and a small amount of a glycol half ether. Furthermore, Scopf and Kottler (Ann. 539, 128 (1939)) showed that 2-amino-4,6-dihydroxypteridine (xanthopterin) is rapidly attacked by sodium chlorate in hydrochloric acid solutions at 100° C. with the formation, through transient intermediates, of oxalic acid, glyoxylic acid, guanidine and urea. It is also known that when 2-amino-4-hydroxy-6-pteridine carboxylic acid is treated with chlorine water, hydrolysis takes place and guanidine can be detected (Angier, et al., Science 103, 667 (1946)). Also, Whittle, et al., (J. A. C. S. 69, 1786 (1947)) showed that sodium chlorate reacted with pteroylglutamic acid at 80° C. to cleave the molecule and produce 2-amino-4-hydroxypteridine-6-carboxylic acid and 4-amino-3,5-dichlorobenzoylglutamic acid. The prior art, as illustrated above, discloses that the action of halogens such as chlorine on substituted pteridines produces numerous and varied products and causes the degradation of the pteridine ring itself.

We have now found that certain substituted pteridines can be reacted with halogens to produce disubstituted halogen derivatives in accordance with the following equation:

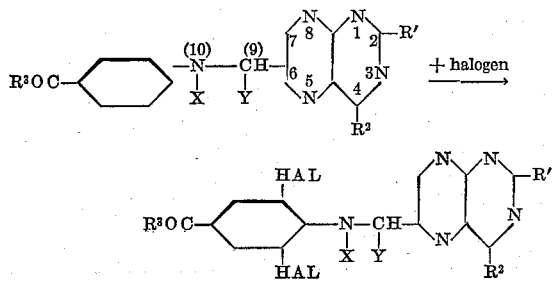

In the above equation, $R'$ and $R^2$ are radicals such as amino, hydroxyl, lower alkylamino and lower dialkylamino, $R^3OC$ is a carboxyl radical or an amino acid amide thereof, X and Y are hydrogen or a lower alkyl radical, and HAL is a halogen radical such as chlorine, bromine or iodine.

The process of the present invention is preferably carried out in a solvent such as an aqueous solution of a mineral acid to which the halogen may be added as a gas or in a suitable solvent such as acetic acid. The halogen may also be formed in situ such as by using hydrogen peroxide or iodine monochloride in the presence of hydrochloric acid.

The intermediates used in the process of the present invention have been described generally in the chemical literature. In general, they may be prepared by reacting a 4,5-diaminopyrimidine having the desired substituents in the 2 and 6-positions such as 2,4,5-triamino-6-hydroxypyrimidine, with a halogeno aldehyde or ketone such as a trihalo acetone, dihalopropionaldehyde, butylchloral, etc., and a primary or secondary aminobenzoic acid or an amino acid amide thereof, such as p-aminobenzoylglutamic acid. This general method is described in J. A. C. S. 70, pages 19 and 1922 (1948); J. A. C. S. 71, 1753 (1949) and in other chemical literature.

The compounds of the present invention may also be prepared by the general method described immediately above in which the primary or secondary aminobenzoic acid or amino acid amide contains one or more halogeno radicals on the aryl ring. These compounds and their method of preparation are described and claimed in our copending application, Serial No. 151,539, filed March 23, 1950.

The process of the present invention is preferably carried out at a temperature within the range of −10° C. to 35° C. It has been found that better yields are obtained at the lower temperatures within the above range.

In carrying out the present process, it is preferred that approximately 2 mols of halogen be used for each mol of intermediate used. Should more than 2 mols of halogen be used per mol of intermediate, a further reaction may take place between the dihalo derivative obtained and the excess halogen which may result in complete degradation of the pteridine molecule. Also, the addition of substantially less than 2 mols of halogen will result in a mixture of final products.

The compounds obtained by the process of the present invention which do not have substituents in the 9- and/or 10-positions form the hydrohalide salt of the desired dihalo compound which precipitates as the reaction proceeds. However, in those compounds having substituents in the 9- and/or 10-positions, the hydrohalide salt does not precipitate and the desired dihalo compound is isolated by neutralization of the acid salt.

The compounds of the present invention have outstanding activity as antagonists to pteroylglutamic acid and accordingly, are of great potential importance in medicine in an experimental capacity or possibly in the treatment of disease.

The process of the present invention will be further illustrated by the following examples wherein representative dihalo substituted pteridines are prepared from the corresponding substituted pteridines by direct halogenation. Parts are by weight unless otherwise indicated.

Example 1

A solution of 36 parts of bromine in 800 parts of glacial acetic acid and 200 parts of acetic anhydride is added gradually as decolorized to a slurry of 100 parts of pteroylglutamic acid in 2500 parts of glacial acetic acid at 70° C. After an hour the mixture is cooled slowly and filtered.

In this example one mole of bromine is used to each mole of pteroylglutamic acid and a mixture results which is more difficult to purify than in those experiments wherein two moles of bromine are used to each mole of intermediate.

Example 2

A solution of 88.2 g. of pteroylglutamic acid in 882 cc. of concentrated hydrochloric acid is diluted with 882 cc. water and cooled to 0° C. Chlorine gas is bubbled in until 32 g. is absorbed. After cooling one-half hour, the thick slurry is filtered and washed with 500 cc. dilute hydrochloric acid. The cake is dissolved in one liter of concentrated hydrochloric acid, treated with activated charcoal and filtered. The filtrate is diluted with one liter of water and the mixture cooled. The precipitate is separated by filtration and washed with dilute hydrochloric acid. The cake is slurried in one liter of water, and ammonium hydroxide is added to dissolve. The solution is filtered and added slowly with stirring to 6 liters of acetone. The precipitated ammonium salt is filtered off and washed with acetone. On drying, 61 g. of 3',5'-dichloropteroylglutamic acid is obtained.

Example 3

A solution of 4.4 g. of pteroylglutamic acid in 44 cc. concentrated hydrochloric acid is diluted with 20 cc. water and the resulting solution cooled to 0° C. To this is added 1.4 g. of chlorine dissolved in 24 cc. glacial acetic acid. After standing 5 minutes the solution is diluted with 50 cc. water, and 3',5'-dichloropteroylglutamic acid is isolated and purified as in Example 2.

Example 4

A solution of 5.7 g. of pteroyl-alpha-glutamylglutamic acid (diopterin) in 57 cc. concentrated hydrochloric acid is diluted with 57 cc. water, cooled to 0° C. and treated with 1.6–1.7 g. of chlorine. The mixture is cooled overnight. The precipitate, isolated by filtration, is dissolved in 250 cc. concentrated hydrochloric acid. After the solution is treated with activated charcoal and filtered, the filtrate is diluted with 500–600 cc. water. After cooling overnight, the precipitate is filtered, washed with dilute hydrochloric acid, and dissolved in water with ammonium hydroxide. The volume is 128 cc. and is poured slowly into 1280 cc. acetone. The ammonium salt of 3',5'-dichloropteroyl-alpha-glutamylglutamic acid is filtered, washed with acetone, and dried to give 7.8 g.

Example 5

A solution of 6.86 g. of pteroyl-gamma-glutamyl-gamma-glutamylglutamic acid (teropterin) in 73.1 cc. of concentrated hydrochloric acid is diluted with 73.1 cc. water and cooled to 0° C. Then 1.7 g. of chlorine is bubbled in. The mixture is cooled one-half hour longer and then filtered and washed with cold dilute hydrochloric acid. The cake is dissolved in a little water with ammonium hydroxide to dissolve. The volume is 92 cc. and is added slowly to 600 cc. acetone. The sticky gum is freed of acetone by decantation and triturated with alcohol. The ammonium salt of 3',5'-dichloropteroyl-gamma-glutamyl-gamma-glutamylglutamic acid is isolated by filtration, washed with alcohol and dried; weight, 5.2 g.

Example 6

A solution of 4.4 g. pteroylglutamic acid in 44 cc. concentrated hydrochloric acid is diluted with 44 cc. water. After warming to 30° C., 3.25 g. of iodinemono-chloride is added. After cooling overnight, the heavy precipitate is filtered, washed with dilute hydrochloric acid, and dissolved in 30 cc. concentrated hydrochloric acid. The solution is diluted with 30 cc. water and the mixture cooled and filtered. The cake is washed with dilute hydrochloric acid and slurried in 250 cc. water. To the slurry is added sodium hydroxide to about pH 1–2. The moisture is filtered and the cake washed with water. The 3',5'-diiodopteroylglutamic acid, when dry, weighed 3.2 g.

Example 7

A solution of 44.1 g. pteroylglutamic acid in 441 cc. concentrated hydrochloric acid is diluted with 441 cc. water and cooled to 0° C. Bromine gas is bubbled in until 33.9 g. is absorbed. After cooling, about twenty minutes, the precipitate is filtered and washed with cold, dilute hydrochloric acid. The cake is dissolved in 500 cc. concentrated hydrochloric acid, treated with activated charcoal and filtered. The filtrate is diluted with 500 cc. water and the mixture cooled. The precipitate is isolated by filtration, washed with cold, dilute hydrochloric acid, and slurried in 1250 cc. water. To the slurry is added ammonium hydroxide to dissolve. The solution is added slowly and with stirring to 6,875 cc. acetone. The precipitated ammonium salt of 3',5'-dibromopteroylglutamic acid is filtered and washed with acetone and dried. The product weighs 45 g.

Example 8

A solution of 22 g. 4-aminopteroylglutamic acid in 300 cc. concentrated hydrochloric acid is diluted with 300 cc. water. After cooling to 0° C., 7.7 g. of chlorine gas is bubbled in. The mixture is cooled a little longer, filtered, and washed with 200 cc. cold, dilute hydrochloric acid, and the solution treated with activated charcoal and filtered. The filtrate is diluted with water, and the mixture cooled and filtered. The cake is washed with dilute hydrochloric acid and then dissolved in 500 cc. water with ammonium hydroxide. After heating to 70° C., the thick mass is poured into 2450 cc. acetone and stirred. After cooling overnight, the ammonium salt is filtered, washed with acetone, and dried to give 17.4 g. of 3',5'-dichloro-4-aminopteroylglutamic acid.

Example 9

A solution of 4.4 g. of 4-aminopteroylglutamic acid in 44 cc. concentrated hydrochloric acid is diluted with 44 cc. water, cooled to 0° C. and 3.5 g. of bromine vapor bubbled in. After filtering and washing with dilute hydrochloric acid, the cake is slurried in one liter of water and sodium hydroxide added to dissolve. The solution is treated with hydrochloric acid to pH 2–3, and the precipitate filtered off. The cake is again slurried in 1 liter of water and magnesium oxide added to dissolve at 60° C. After addition of activated charcoal and clarification, the filtrate is cooled and the precipitated magnesium salt filtered off and recrystallized from one liter of boiling water. On cooling, the magnesium salt is filtered, washed with water and acetone, and dried. The magnesium salt of 3',5'-dibromo-4-amino-pteroylglutamic acid weighs 2.9 g.

Example 10

A solution of 4.12 parts of 4-aminopteroyl-aminomalonic acid is prepared by heating to 50° C. with 1500 volumes 6 N hydrochloric acid and filtering off the small quantity of undissolved solid. The filtrate is cooled to 0° C. to 2° C., then chlorine is passed slowly into the solution until 1.4 parts has been absorbed. The solution is allowed to stand at 0° C. to 5° C. for twenty minutes. While maintaining the temperature below 30° C. by means of external cooling, 50% sodium hydroxide is added slowly until the solution is at pH 2–2.5. The light brown amorphous solid is filtered off at 15° C., and washed well with cold 6 N hydrochloric acid.

The wet cake is purified by dissolving in cold concentrated (36%) hydrochloric acid, and diluting with 2 volumes hot water, and the material is finally isolated as a deep yellow ammonium salt by addition of acetone to its aqueous solution; the yield is 1.59 parts of 3',5'-dichloro-4-aminopteroylaminomalonic acid.

Example 11

A sample of 4.24 parts of 4-aminopteroyl-dl-isoleucine is dissolved in 63 volumes concentrated (36%) hydrochloric acid; then 42 volumes water is added, and the temperature is lowered to 5° C. To this solution at 0° C. to 5° C. is slowly added 1.4 parts chlorine, which causes the precipitation of some light yellow solid. This slurry is allowed to stand at 0° C. to 5° C. for twenty minutes, during which time more light yellow solid precipitates. Finally, 21 parts water is added, which causes the formation of a heavy gelatinous precipitate. After standing at 0° C. to 5° C. for ½ hour, the solid is filtered off and washed with 50 volumes 5 N hydrochloric acid.

This material is purified as described in Example 10 above; the weight of the light yellow ammonium salt of 3',5'-dichloro-4-aminopteroyl-dl-isoleucine is 6.3 parts.

Example 12

A sample of 4.10 parts of aminopteroyl-dl-valine is dissolved in a solution of 168 volumes concentrated (36%) hydrochloric acid and 21 volumes water at 30° C. The temperature is lowered to 0° C. to 5° C. and 1.4 parts chlorine is slowly added; this causes the precipitation of a small quantity of yellow solid. The reaction mixture is allowed to stand 20 minutes at 0° C. to 5° C., then 147 volumes water is added which precipitates much more yellow solid. After standing 30 minutes at 0° C. to 5° C., the solid is filtered and washed with 50 volumes 5 N hydrochloric acid.

This material is purified as described in Example 10 above; the weight of the ammonium salt of 3',5'-dichloro-4-aminopteroyl-dl-valine is 13.8 parts.

Example 13

A solution of 4.9 g. of 9,10-dimethylpteroylglutamic acid in 44 cc. concentrated hydrochloric acid is diluted with 44 cc. water, cooled to 0° C. and 1.4 g. of chlorine bubbled in. After allowing to stand cold ½ hour, the solution is diluted with water to give, when filtered, washed and dried, 2.5 g. of 3',5'-dichloro-9,10-dimethylpteroylglutamic acid.

Example 14

A solution of 4.5 g. of 9-methylpteroylglutamic acid in 44 cc. concentrated hydrochloric acid is diluted with 44 cc. water, cooled to 0° C., and 2 g. of chlorine is bubbled in. To the resulting solution at 0° C. is added sodium hydroxide to about pH 3. The precipitate of 3',5'-dichloro-9-methylpteroylglutamic acid is isolated by filtration and when washed and dried weighs 4.0 g.

Example 15

A solution of 4.9 g. of 4-amino-9,10-dimethylpteroylglutamic acid in 44 cc. concentrated hydrochloric acid is diluted with 44 cc. water, cooled to 0° C. and 1.4 g. of chlorine is bubbled in. After standing cold for 10–15 minutes, the solution is diluted with water and neutralized to about pH 3–4 with sodium hydroxide. The precipitate, 3',5' - dichloro - 4 - amino-9,10-dimethylpteroylglutamic acid, after filtering, washing, and drying, weighs 3.2 g.

Example 16

A solution of 5 g. of 4-amino-$N^{10}$-methylpteroylglutamic acid in 44 cc. concentrated hydrochloric acid is diluted with 44 cc. water, cooled 0°–5° C. About 1.4 g. of chlorine is bubbled in. After standing 10–20 minutes, 88 cc. of water is added. To the cooled solution is added sodium hydroxide to pH 3–4. The gummy solid is cooled one and a half hours longer, filtered, washed with water and dissolved in 100 cc. acetic acid. The solution is treated with activated charcoal, clarified, and diluted with 400 cc. of water and cooled. The precipitate of 3',5'-dichloro-4-amino-N-methylpteroylglutamic acid is filtered, washed with water and acetone, and when dried, weighs 2.1 g.

Example 17

A solution of 4.9 g. of $N^{10}$-methylpteroylglutamic acid in 44 cc. concentrated hydrochloric acid is diluted with 44 cc. water and cooled to 0° –5° C. About 1.4 g. of chlorine is bubbled in, and the solution allowed to stand 15–20 minutes. It is then diluted with 88 cc. water and sodium hydroxide added to about pH 2–3. The gum which precipitates gradually solidifies on cooling for 1 hour. The material is filtered, washed with water, and dissolved in 230 cc. boiling acetic acid. The solution is treated with activated charcoal and clarified. To the filtrate is added 500 cc. hot water. After cooling overnight, the precipitate, 3',5' - dichloro - N - methylpteroylglutamic acid, is filtered, washed with water and, when dried, weighs 3.6 g.

Example 18

A solution of 1.76 g. 2-dimethylamino-4-aminopteroylglutamic acid in 25-30 cc. concentrated hydrochloric acid and 22-25 cc. 5 N hydrochloric acid is cooled to 0° C. and 0.6 g. of chlorine gas bubbled in. After standing 10-15 minutes cold, 50 cc. water is added and cooling continued. The yellow solid is filtered and dissolved in warm water. Sodium hydroxide is added to the solution to pH 3-4. The mixture is cooled, filtered, and the precipitate, 3',5'-dichloro-2-dimethylamino - 4 - aminopteroylglutamic acid, dried, weighs 1.24 g.

We claim:

1. A method of preparing compounds having the general formula:

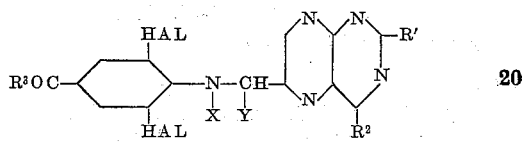

in which R' and R² are members of the group consisting of amino, hydroxyl, lower alkylamino and lower dialkylamino radicals, R³OC is a member of the group consisting of a carboxyl radical and amino acid amides thereof, X and Y are members of the group consisting of hydrogen and lower alkyl radicals and HAL is a halogen of the group consisting of chlorine, bromine and iodine, which comprises reacting a compound having the formula:

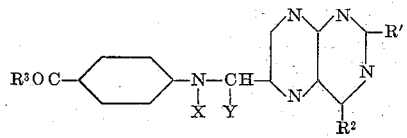

in which R', R², R³OC, X and Y are as defined above with a halogen of the group consisting of chlorine, bromine and iodine in a solvent, and recovering said product therefrom.

2. A method of preparing 3',5'-dichloropteroylglutamic acid which comprises dissolving one mol of pteroylglutamic acid in an aqueous hydrochloric acid solution, adding two mols of chlorine thereto and recovering said compound therefrom.

3. A method of preparing 3',5'-dichloro-4-aminopteroylglutamic acid which comprises dissolving one mol of 4-aminopteroylglutamic acid in an aqueous hydrochloric acid solution, adding thereto two mols of chlorine and recovering said compound therefrom.

4. A method of preparing 3',5'-dichloro-9,10-dimethylpteroylglutamic acid which comprises dissolving one mol of 9,10-dimethylpteroylglutamic acid in an aqueous hydrochloric acid solution, adding thereto two mols of chlorine and recovering said compound therefrom.

5. A method of preparing 3',5'-dichloro-9-methylpteroylglutamic acid which comprises dissolving one mol of 9-methylpteroylglutamic acid in an aqueous hydrochloric acid solution, adding two mols of chlorine and recovering said compound therefrom.

6. A method of preparing 3',5'-dichloro-4-amino - $N^{10}$ - methylpteroylglutamic acid which comprises dissolving one mol of 4-amino-$N^{10}$-methylpteroylglutamic acid in an aqueous hydrochloric acid solution, adding two mols of chlorine and recovering said compound therefrom.

7. A method of preparing compounds having the general formula:

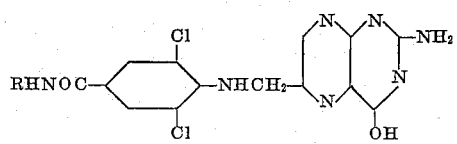

in which RHN is an amino acid radical which comprises reacting one molecular equivalent of a compound having the formula:

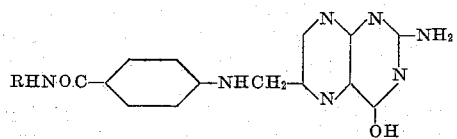

in which RHN is as defined above, with two molecular equivalents of chlorine in a solvent.

8. A method of preparing compounds having the general formula:

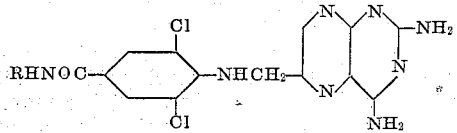

in which RHN is an amino acid radical, which comprises reacting one molecular equivalent of a compound having the formula:

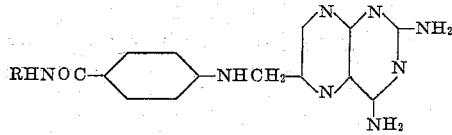

in which RHN is as defined above, with two molecular equivalents of chlorine in a solvent.

DORIS RUTH SEEGER.
DONNA BERNICE COSULICH.

No references cited.